May 1, 1934.    R. C. RAILING    1,957,290
QUACK GRASS ERADICATOR
Filed July 30, 1932    2 Sheets-Sheet 1
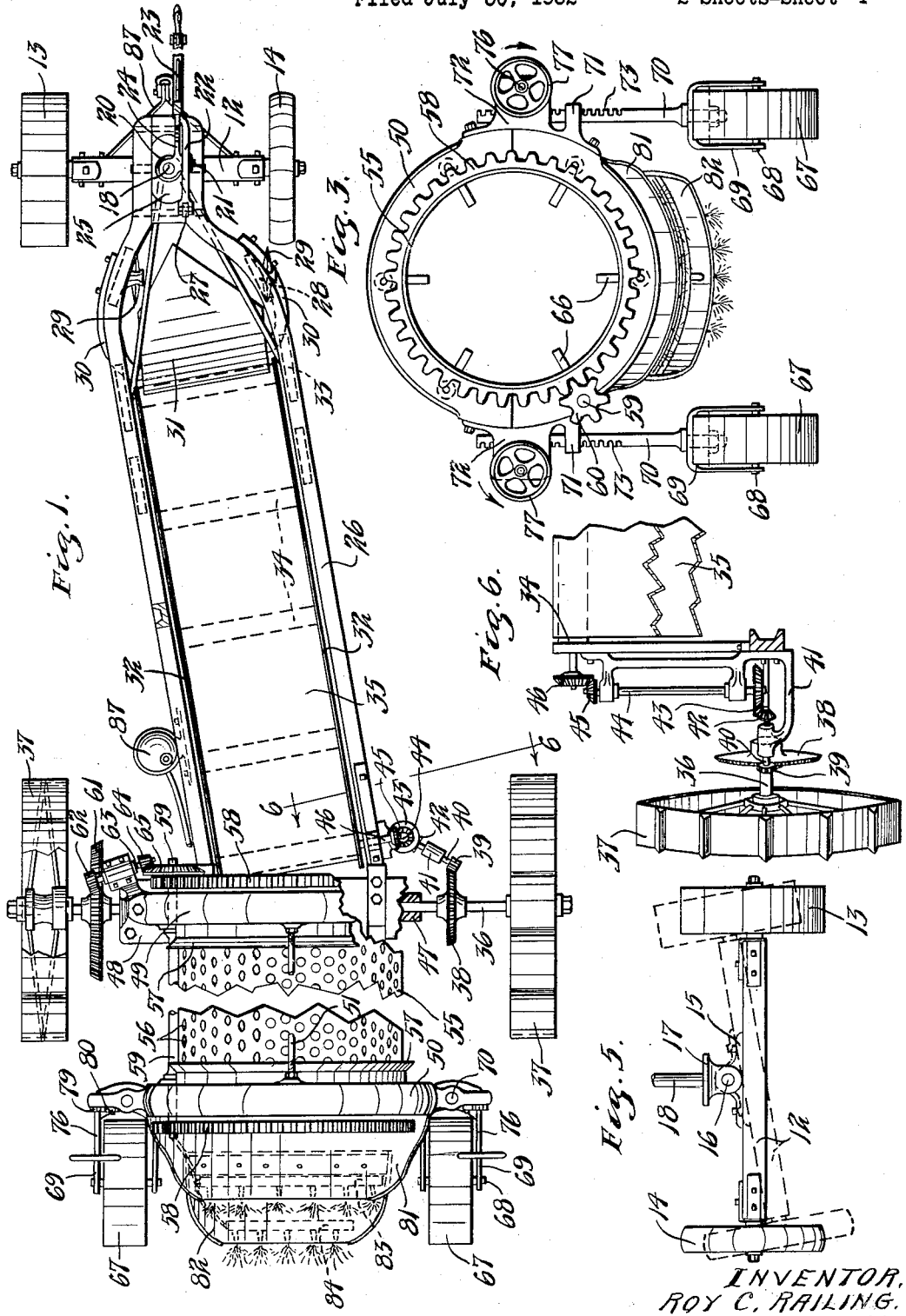
INVENTOR,
ROY C. RAILING.
BY HIS ATTORNEYS.
Williamson & Williamson May 1, 1934.  R. C. RAILING  1,957,290
QUACK GRASS ERADICATOR
Filed July 30, 1932   2 Sheets-Sheet 2
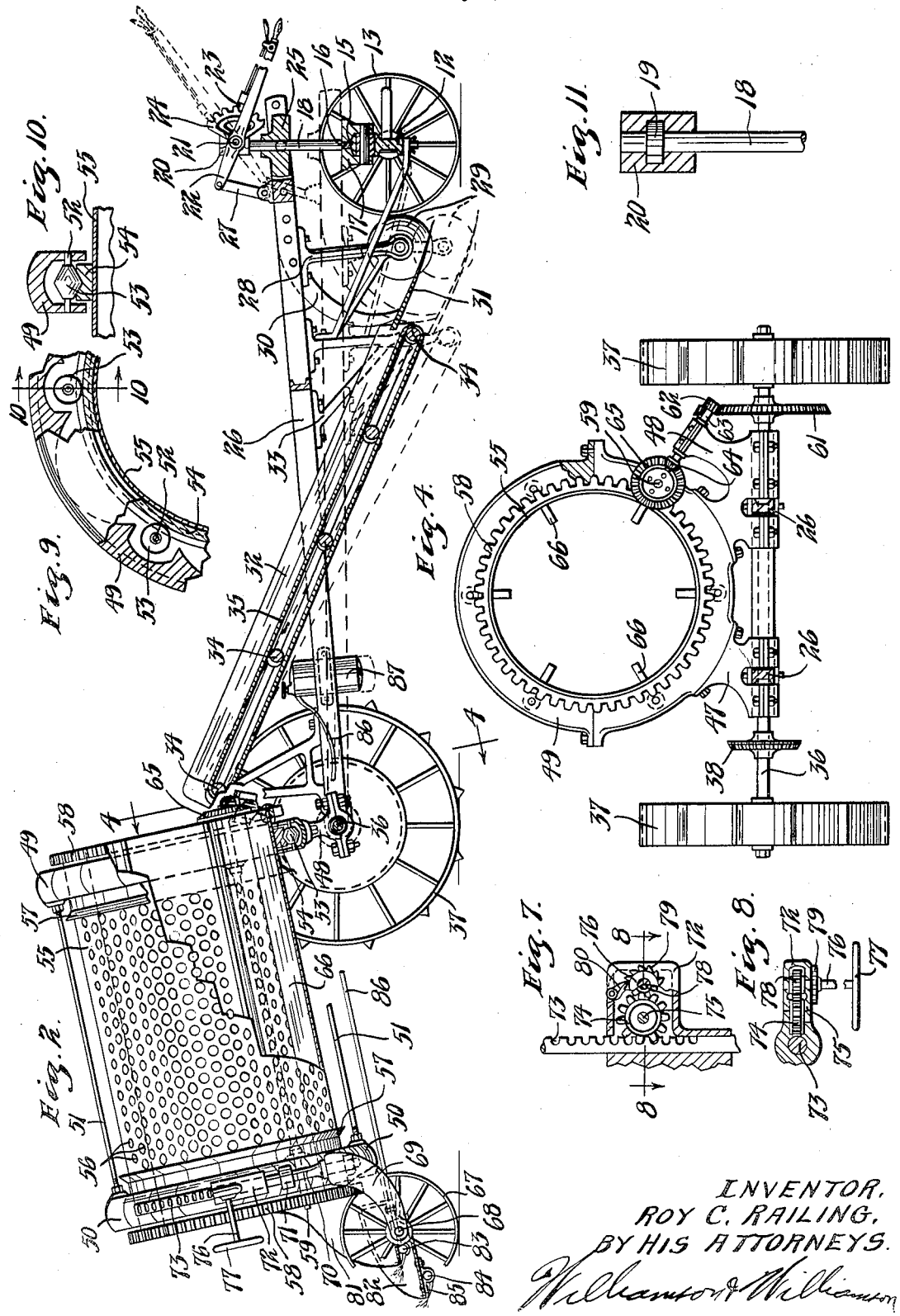
INVENTOR.
ROY C. RAILING.
BY HIS ATTORNEYS.

Patented May 1, 1934

1,957,290

UNITED STATES PATENT OFFICE 1,957,290

QUACK GRASS ERADICATOR

Roy C. Railing, Minneapolis, Minn.

Application July 30, 1932, Serial No. 626,920

9 Claims. (Cl. 97—10)

This invention relates to quack grass eradicators.

It is the general object of this invention to provide a novel and improved quack grass eradicator which can be drawn over the ground to efficiently, permanently destroy all quack grass grown in the ground.

To this end, generally stated, the invention consists in the novel parts and novel combinations of parts hereinafter defined in the claims and described in the following specification, made in connection with the accompanying drawings, wherein like reference characters refer to the same or similar parts throughout the various views, and, in which, Fig. 1 is a plan view of a machine embodying the invention, certain parts being broken away and other parts being shown in section;

Fig. 2 is a view partly in side elevation and partly in vertical section taken through the machine, certain parts being shown in one position in full lines and in another position in dotted lines;

Fig. 3 is a view in rear elevation of the machine;

Fig. 4 is a view in vertical section taken substantially on the line 4—4 of Fig. 2, as indicated by the arrows, the elevator not being shown;

Fig. 5 is a view in front elevation of the front axle and associated parts of the machine, two different positions of the axle being shown in full and dotted lines respectively;

Fig. 6 is a vertical section taken substantially on the line 6—6 of Fig. 1 as indicated by the arrows and illustrating the drive for the elevator, this drive not being shown in Fig. 4;

Fig. 7 is a view partly in vertical section and partly in rear elevation illustrating details of one of the means for raising and lowering the separator drum;

Fig. 8 is a horizontal section taken on the line 8—8 of Fig. 7 as indicated by the arrows;

Fig. 9 is a view partly in vertical section and partly in front elevation illustrating one of the circular supports within which the separator drum is rotatably mounted;

Fig. 10 is a vertical section taken on the line 10—10 of Fig. 9; and

Fig. 11 is a sectional detail through the upper portion of the post connected with the front axle.

In accordance with the present invention there is provided a front axle 12 equipped at its left end with a ground wheel 13 and equipped at its right end with a furrow wheel 14. This axle 12 is provided at its upper side adjacent its center with a suitable bracket 15 within which there is mounted a horizontal pin 16 forming a pivot upon which a forked head 17 is journaled. A vertical shaft-like post 18 is secured to the head 17 and this post projects upwardly some little distance above axle 12 and it carries adjacent its upper end a flange or collar 19. A split block 20 rabbeted to receive the flange 19 is journaled on the post 18 adjacent its upper end and this block carries a trunnion 21 on which a hand lever 22 is pivoted. This lever carries a handle operated spring pressed dog 23 adapted to be engaged with any one of a number of teeth in a toothed segment 24 carried by block 20. Slidably mounted for vertical movement on the post 18 below block 20 is a circular block 25 having lateral trunnions journaled in the forward end of a frame 26. This frame projects rearwardly from front axle 12 for some distance and extends laterally and to the right of the front axle. A link 27 pivotally connects the rear end of lever 22 with the forward portion of frame 26. It will be seen that by raising or lowering the lever 22, the forward end of frame 26 can be lowered or raised to a desired height. It will also be seen that frame 26, block 20 and lever 22 may swing about the post 18 as a vertical pivot. It will also be observed that front axle 12 may tilt about the axis of pin 16 without changing the inclination of post 18. In Fig. 5 the axle is shown in one position in full lines and in a tilted position in dotted lines.

Secured to the side bars of frame 26 somewhat rearwardly from the pivotal connection of the frame with the link 27 are a pair of suitably braced standards 28 carrying coulter disks 29, the right hand disk of which is located immediately behind furrow wheel 14, and the left hand disk of which is located directly opposite the right hand disk when the frame 26 is positioned as shown in Fig. 1 and the axis of the disks is parallel to the front axle 12. A pair of arcuate shoe supporting bars 30 project downwardly from the sides of frame 26 behind the standards 28 and they carry at their lower end a digger shoe 31, of any suitable type, which works between the two coulter disks 29 but is set at an inclination relative to the axis through the two disks 29. A pair of side boards 32 forming part of an elevator are secured to the sides of frame 26 and at their lower ends to suitable brackets 33 located rearwardly from the digger shoe 31 and extending somewhat below the rear edge of the digger shoe. The side boards 32 project from their forward ends below frame 26 upwardly and rearwardly to points considerably above the frame. Journaled within the side boards 32 are a plurality of rollers 34 over which an endless flexible apron 35 travels. The side boards 32, rollers 34 and apron 35 form an elevator which receives the dirt and other material dug up by the digger shoe 31 and raises the same to a point above the frame 26 adjacent the rear end of the same.

The rear end of the frame 26 is journaled at spaced points on a rotating axle 36 equipped at its two ends with traction wheels 37, of the type commonly used on mowers and other similar farm machinery. To drive the elevator from the rotating axle 36, the axle is equipped adjacent its right end with a beveled gear 38 meshing with a smaller beveled gear 39 mounted at the outer end of a short shaft 40 journaled in a bearing formed in a bracket 41 secured to the right side of frame 26. The inner end of shaft 40 is also provided with a beveled gear 42 meshing with a larger beveled gear 43 mounted at the lower end of a vertical shaft 44 also journaled in bracket 41. The upper end of shaft 44 carries a beveled gear 45 meshing with the beveled gear 46 secured to the right hand trunnion of uppermost and rearmost roller 34 of the elevator. With this construction it will be seen that as the axle 34 revolves to carry the machine over the ground in a forward direction, the upper run of the apron 35 of the elevator will be moved upwardly and rearwardly. Any other suitable driving connection may be made to cause proper operation of the elevator as the machine travels over the ground.

The axle shaft 36 is journaled in a pair of bearing brackets 47 and 48 respectively which in turn are secured to the lower section of a sectional ring 49, of quite large diameter. A similar sectional ring 50 is located some distance behind the ring 49 and in parallel relation therewith and the two rings are interconnected and secured together as by means of rods 51 extending between the same. Each of the two rings 49 and 50 is channeled as best shown in Figs. 9 and 10 and each ring has a plurality of roller pins 52 extending between the channeled portions thereof at circumferentially spaced points. On each roller pin 52 there is mounted a roller 53 shaped as best shown in Fig. 10. The roller 53 may be best described as corresponding to a figure formed by joining together the larger bases of two truncated cones. The rollers 53 ride within circumferential V-shaped grooves formed in circular tracks 54 mounted adjacent the two ends of a hollow separator drum 55.

Drum 55 is open at its two ends and is made preferably of sheet metal through which a multiplicity of small perforations 56 have been punched. The size of the perforations 55 in the drawings is greatly exaggerated relative to the proportions of the other parts of the machine in order that these perforations may be clearly seen. The perforations 56 terminate short of the two tracks 54 and skirts 57 are secured to the drum 55 adjacent but centrally spaced from the two tracks. The rear skirt 57 projects outwardly and somewhat forwardly from the drum while the forward skirt projects outwardly and somewhat rearwardly from the drum. Large ring gears 58 are secured to drum 55 at its two ends. A shaft 59 journaled in the two rings 49 and 50 carries adjacent its ends pinions 60 which mesh with the ring gears 58 to drive the same. Although any suitable drive may be provided for driving the shaft 59, in the drawings there is shown a large beveled gear 61 mounted on the axle shaft 36 adjacent the left wheel 37 and this gear 61 meshes with a small beveled gear 62 mounted at the outer end of an inclined shaft 63 journaled in bearing bracket 48. Another beveled gear 64 is mounted on the inner end of shaft 63 and this gear 64 meshes with a larger beveled gear 65 carried by the shaft 59 at its forward end. It will be seen that as the machine runs over the ground and axle shaft 36 is rotated, the drum 55 will be rotated, relative to rings 49 and 50. Longitudinal displacement of the drum 55 relative to the said rings is prevented by reason of the peculiar construction of the rollers 53 and the grooved tracks 54. Projecting radially inwardly from the inner side of the drum 55 at circumferentially spaced points are a plurality of bars 66 which extend longitudinally from one end of the drum to the other. The lower portion of the forward end of the drum 55 is located below the upper rear end of the conveyer formed by the side boards 32, rollers 34 and apron 35, in order that the conveyer may discharge into the forward end of the drum.

To support the rear end of the drum 55 there are provided a pair of caster wheels 67 journaled on a short shaft 68 carried by forked caster wheel brackets 69 to which posts 70 are swivelly connected. These two posts 70 run upwardly through apertured lugs 71 mounted on the rear ring 50 and they extend through gear casings 72 also mounted on the rear ring 50 above the lugs 71. Rack teeth 73 are formed in the upper outer portions of the posts 70 and pinions 74, mounted on short shafts 75 within the gear casing 72, mesh with these rack teeth 73. To turn the pinions 74, rearwardly extending shafts 76 equipped with wheels 77 at their rear ends are journaled adjacent their forward ends in the gear casing 72 and each shaft 76 carries a pinion 78 within one of the casings 72 which meshes with the pinion 74 within the same casing. Ratchets 79 are secured to each shaft 76 and dogs 80 pivoted on the casings 72 are located for cooperation near the respective ratchets 79. With the construction shown, it will be seen that if the two wheels 77 are turned in the direction indicated by the arrows, Fig. 3 simultaneously, the rear end of the drum 55 will be raised to change the inclination of the same relative to the ground, and the dogs 80 will engage the ratchets 79 by gravity to retain the rear end of the drum at the set level. Similarly by disengaging the dogs 80 from the ratchets 79 and by simultaneously turning wheels 77 in the directions opposite to those shown in Fig. 3, the rear end of the drum may be lowered whereupon the dogs 80 may be again thrown into engagement with the ratchets 79 to hold the rear end of the drum set in its lower position. Normally the drum 55 will be set as best shown in Fig. 2 so that it inclines downwardly somewhat from its forward end to its rear end.

Secured to rear ring 50 at its bottom and adjacent the lower portions of its sides, is an upper arcuate chute plate 81 which projects rearwardly from the drum 55 and takes the same inclination as the drum. Supported from the upper chute plate 81 in spaced relation below the same and projecting rearwardly thereof is a lower arcuate chute plate 82. Burners 83 and 84 respectively having rearwardly projecting nozzles 85 are mounted respectively below the two chute plates 81 and 82 in such position that the nozzles 85 terminate adjacent the rear edge of these plates. Although any type of burner may be employed, in the drawings there are illustrated gasoline pressure burners, the fuel being supplied to the burners from a fuel tank 87 mounted on the frame 26 and adapted to contain gasoline under air pressure. A fuel supply conduit 86 which may be at least in part flexible, runs rearwardly from the tank 85 to the two burners 83 and 84.

Secured to the front axle 12 and projecting forwardly therefrom is a suitable bracket 87 which will permit a lead vehicle such as a tractor to be connected to the machine.

*Operation*

In operation a tractor or a team of horses may be connected to the machine whereupon the machine will be drawn over a field infested with quack grass. The burners 83 and 84 will of course be set in operation so that flames from the nozzles 85 will play over the lower portions of the rear edges of the chute plates 81 and 82. As the machine moves over the field, the different wheels will take about the position shown in Fig. 1, i. e. the ground wheel 13 and the left traction wheel 37 will run approximately in line with each other when the machine runs straight forwardly, while the right traction wheel 37 will be offset considerably to the right from the furrow wheel 14. The drum 55 will be disposed behind and to the right of the digger shoe 31 but neither the drum nor either of the chute plates 81 or 82 will be located to the left of the digger shoe 31. The elevator will of course be set in operation and the drum 55 will be rotated. By raising the lever 22 as from the full line position shown in Fig. 2 to the dotted line position there shown, the coulter disks 29 and the digger shoe 31 will be carried into the ground. The digger shoe 31 will then raise soil, roots and herbage to discharge the same onto the apron 35 of the elevator whereupon the elevator will lift the soil, roots and herbage upwardly and rearwardly to discharge the same into the forward portion of the rotating separator drum 55. This drum will be set at such an inclination that the material entering the same will not of its own accord slide by gravity rearwardly through the drum, but as the drum will be set with its rear end located below the level of its forward end, the inclination of the drum will cause rearward movement of material in the drum as will now be described. As the drum 55 rotates and as the material is discharged into the same at its forward end, the material will be caught by the bars 66 and raised therewith toward the top of the drum. The material will then be dropped by the bars to fall downwardly against the bottom part of the drum in rearwardly spaced relation from the point where the same material was first caught by the bars. In other words the material will be moved slowly rearwardly by progressive steps and it will be progressively dropped from considerable height against the lower portions of the drum. As the material is dropped, lumps of dirt will be pulverized and the loose soil will freely pass through the perforations 56 to discharge back onto the ground over points where other soil has been dug up by the digger shoe 31. The quack grass roots and whatever herbage may be delivered to the drum 55 will not pass through the perforations 56 will the pulverized soil as the perforations are too small to permit of this. Accordingly, quack grass, quack grass roots and the herbage will be retained in the drum but the dirt admitted to the drum and clinging to the roots of the quack grass will be re-distributed on the ground. The drum will be so tilted by means of the wheels 77, as has been previously described, that the material will be retained in the drum during its passage from the front of the same to the rear end thereof sufficiently long that through the dropping movement of the material caused by the bars 66, all loose soil will be discharged through the apertures 56 before the balance of the material is discharged from the rear end of the drum. The quack grass, roots and other herbage will be carried back through the open rear end of the drum onto the upper chute plate 81 and over the rear edge thereof. The flames from the upper burner 83 will play upon the plant life as it drops downwardly from the upper chute plate 81 and will either burn or scorch the plant life so severely as to render the same impotent to again grow. To make doubly sure that the life of the quack grass, roots and other herbage is destroyed, before discharge of the same onto the ground, the second chute plate 82 and the burner 84 are provided over which the plant life passes before it falls to the ground. By adjusting the angle of the drum 55 relative to the ground, the machine may be set up for use to meet different soil conditions, so that a thorough separating action will be obtained between plant life and soil irrespective of whether the soil is wet, sandy, full of clay or what not. The dropping of the material within the drum from a height onto the bottom portion of the drum prevents the perforations 56 from clogging. With a sheet metal drum perforated as described, there is little chance for the plant life to be caught in the drum adjacent the perforations to clog the same as in the case of a drum formed of screening. The skirts 57 protect the ring gears 58 from dirt that passes through the perforations 56.

It will be seen that the digger shoe 31 may be adjustably lowered to dig at any depth. The frame 26 is free to turn about the post 18 so that the machine may be steered by the lead vehicle. Furrow wheel 14 is adapted to ride in the furrow previously made by the digger shoe 31 during prior passage of the machine over the field. As the front axle 12 may readily tip relative to the post 18, it will be seen that the wheel 14 may ride in the furrow while the wheel 13 rides on the ground at a higher level than the wheel 14. The wheel 14 may accordingly be used as a gauge for proper positioning of the machine during its travel over a field after a first furrow has been cut.

Although the machine of the invention is particularly intended for use in destroying quack grass, it will be readily appreciated that the machine may be utilized for digging and separating potatoes, beets, turnips and other sub-surface crops. When the machine is used for such purposes, of course, the burners will not be set in operation and the crops may be either dropped on the ground or collected in bags or the like at the rear of the machine. The machine may also be used for removing rocks and stones from farm land and the like. The rocks, of course, will not pass through the perforations 56 in the drum and may be collected at the rear of the machine or may be dropped on the ground and later collected. As used in the claims the words "quack grass eradicator" shall be taken to mean a machine capable of destroying quack grass, gathering and separating potatoes and other sub-surface crops as well as a machine capable of separating rocks and stones from the soil.

It will be seen that a highly efficient machine has been provided.

It will of course be understood that various changes may be made in the form, details, arrangement and proportions of the various parts without departure from the scope of the present invention.

What is claimed is:—

1. A quack grass eradicator comprising a wheeled support, an open ended perforated separator drum mounted on said support and inclining downwardly and rearwardly from its forward end, means for rotating said drum, a plurality of inwardly projecting longitudinal, agitator bars mounted in said drum, means for varying the inclination of said drum relative to said support, a digger mounted on said support and means for delivering mixed soil and quack grass from said digger to the forward end of said drum.

2. A quack grass eradicator comprising a wheeled support, an open ended perforated separator drum mounted for rotation on said support and inclining downwardly and rearwardly from its forward end, means for rotating said drum, a plurality of radially disposed circumferentially spaced agitator bars mounted in the interior of said drum and extending longitudinally thereof, a digger mounted on said support and means for delivering mixed soil and quack grass from said digger into the forward end of said drum.

3. A quack grass eradicator comprising a wheeled support, an open ended perforated drum mounted for rotation on said support and inclined downwardly and rearwardly from its forward end, means for rotating said drum, means for delivering mixed soil and quack grass into the forward end of said drum and a burner mounted at the rear end of said drum and over which quack grass discharged from said drum must be carried.

4. The structure defined in claim 3, a chute plate mounted at the rear end of said drum and onto which the quack grass discharges from the rear end of said drum, said burner being located below said chute plate and situated to play flames over the rear bottom edge of said chute plate.

5. A quack grass eradicator comprising a wheeled support, an open ended perforated drum mounted for rotation on said support and inclining downwardly and rearwardly from its forward end, means for rotating said drum, a plurality of inwardly projecting longitudinal bars mounted in said drum, means for delivering mixed soil and quack grass into the forward end of said drum and a burner mounted at the rear end of said drum and over which quack grass discharged from the rear end of said drum must travel.

6. The structure defined in claim 5, and means for varying the inclination of said drum relative to said support to vary the time period that material discharged into said drum will be retained within the drum.

7. A quack grass eradicator having in combination a wheeled support, a digger mounted on said support, an elevator receiving the dirt from said digger and raising the same upwardly and rearwardly, a perforated drum mounted for rotation on said support rearwardly of the elevator, said drum being open ended and the elevator being adapted to discharge into the forward end of said drum, means for rotating said drum, a chute projecting rearwardly from said drum and onto which the material passing completely through said drum discharges and a burner mounted on said chute and situated to play a flame over material discharged from said chute onto the ground.

8. The structure defined in claim 7, a second chute mounted below said first mentioned chute and projecting rearwardly thereof and a burner mounted on said second chute and situated to play a flame over material discharged from the rear edge of said second chute.

9. A quack grass eradicator having in combination, a front axle, a ground wheel and a furrow wheel mounted on said front axle, a frame connected to said axle for both pivotal movement about a horizontal axis and swinging movement about a vertical axis relative to said axle, said frame extending rearwardly and somewhat laterally to one side of said front axle, a digger mounted on said frame, an elevator mounted on said frame and receiving from said digger to elevate material upwardly and rearwardly therefrom, a wheel equipped support connected to said frame at its rear end and a rotary separator mounted on said support and receiving from said elevator whereby said furrow wheel may ride in the furrow formed by said digger during previous passage of the eradicator over a field and said ground wheel may ride on unfurrowed soil.

ROY C. RAILING.